(12) United States Patent
Cook et al.

(10) Patent No.: US 10,742,158 B1
(45) Date of Patent: Aug. 11, 2020

(54) CIRCUIT FOR SPLIT SINE WAVE ALTERNATING GROUND PATHS

(71) Applicant: GEG Consulting & Developing International, LLC, Bartow, FL (US)

(72) Inventors: Brian K. Cook, Bartow, FL (US); Mark M. Turner, Bartow, FL (US)

(73) Assignee: GEG Consulting & Developing International, LLC, Bartow, FL (US)

( * ) Notice: Subject to any disclaimer, the term of this patent is extended or adjusted under 35 U.S.C. 154(b) by 0 days.

(21) Appl. No.: 16/441,346

(22) Filed: Jun. 14, 2019

(51) Int. Cl.
*H02P 31/00* (2006.01)

(52) U.S. Cl.
CPC .................. *H02P 31/00* (2013.01)

(58) Field of Classification Search
None
See application file for complete search history.

(56) References Cited

U.S. PATENT DOCUMENTS

| 5,898,280 | A  | * | 4/1999 | Yang | H02P 7/298 318/112 |
| 2010/0164302 | A1 | * | 7/2010 | Beck | H02J 3/383 307/151 |
| 2010/0264732 | A1 | * | 10/2010 | Beck | H02J 7/35 307/24 |

* cited by examiner

*Primary Examiner* — Bentsu Ro
(74) *Attorney, Agent, or Firm* — McHale & Slavin, P.A.

(57) ABSTRACT

A circuit for split sine wave alternating ground paths. The current circuit consists of two DC motors that act as individual power and ground paths for one other DC motor using AC voltage. Each motor supplies power and ground for one leg of a third DC drive motor.

7 Claims, 1 Drawing Sheet

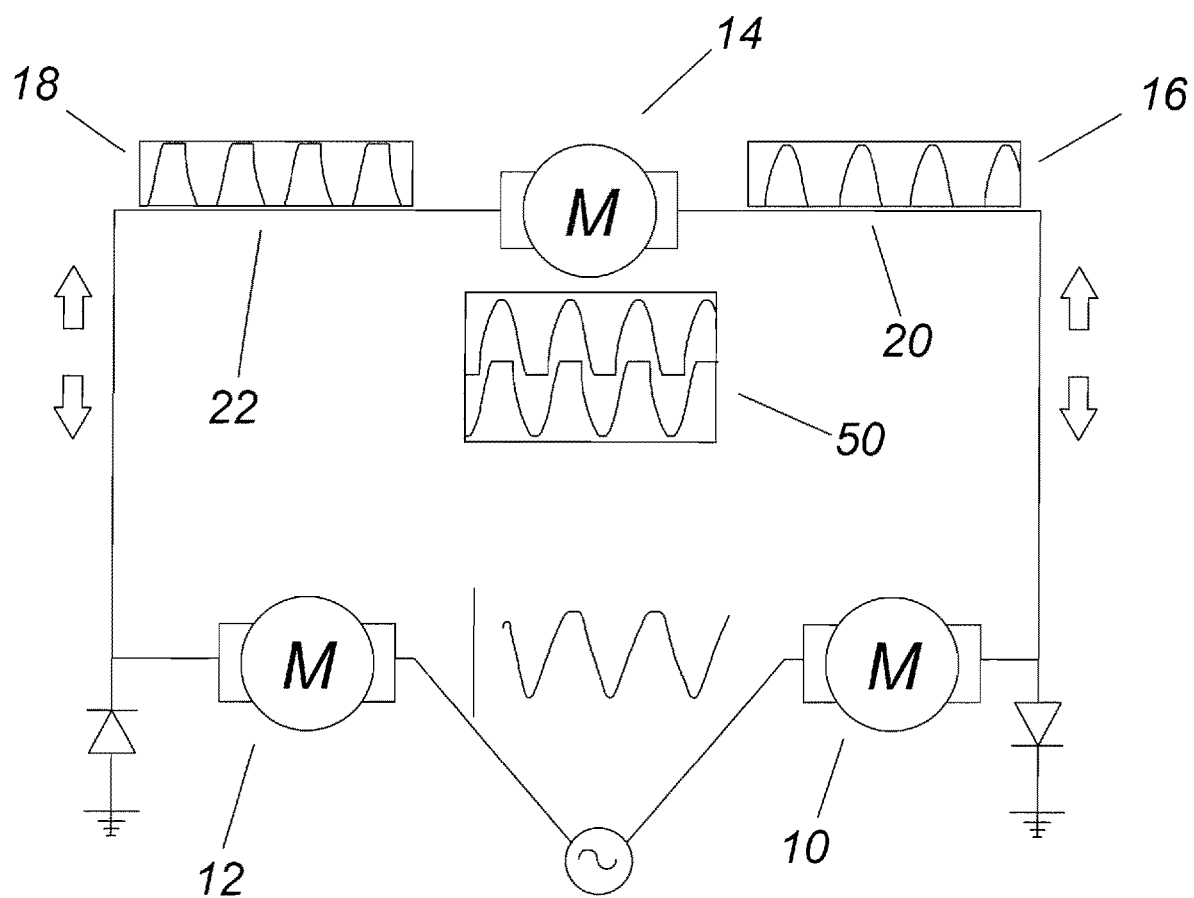

CIRCUIT FOR SPLIT SINE WAVE ALTERNATING GROUND PATHS

FIELD OF THE INVENTION

This invention is directed to the field of electronics and particularly to a circuit for split sine wave alternating ground paths.

BACKGROUND OF THE INVENTION

Conventional electric motors are used in countless applications. The efficiency of the motor dictates the amount of energy consumed, the amount of heat generated, the speed of operation, the maintenance required and the longevity of the apparatus. For instance an electric motor that is 70% efficient converts 80% of the electrical energy inputted into mechanical energy, and the remaining 30% is lost as heat. Motor efficiency is typically a factor of mechanical and electrical imperfections with the stator windings and rotor bars. Motor efficiency is typically a factor of mechanical and electrical imperfections with the stator windings and rotor bars. Energy efficient motors use less electricity, run color and typically last longer than NEMA motors of the same size.

What is needed in the industry is an apparatus and process for increasing the efficiency in a conventional motor.

SUMMARY OF THE INVENTION

A process to split sine wave alternating ground paths. In an exemplary embodiment, two DC motors act as individual power and ground paths for a third DC motor using AC voltage. In this embodiment each motor supplies power and ground for one leg of the third DC motor.

An objective of the invention is employ two DC motors to provide power and ground paths for a third DC motor using AC voltage.

Another objective of the invention is to teach the use of a permanent magnet DC motor powered by an AC source wherein the DC motor exhibits improved efficiency.

Still another objective is to disclose a technology to improve existing motor operation in terms of efficiency, speed, reduced wear, maintenance and downtime.

Other objectives and further advantages and benefits associated with this invention will be apparent to those skilled in the art from the description, examples and claims which follow.

BRIEF DESCRIPTION OF THE DRAWINGS

FIG. 1 is a circuit for split sine wave alternating ground paths.

DETAILED DESCRIPTION OF THE PREFERRED EMBODIMENT

A detailed embodiment of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Disclosed is a circuit for split sine wave alternating ground paths. The current circuit consists of two DC motors 10, 12 that act as individual power and ground paths for a third DC motor 14 using AC voltage. Each motor supplies power and ground for one leg of a third DC drive motor.

Referring to FIG. 1, diodes 16, 18 block half of the AC sine wave coming from motors 10 and 12 on the neutral or ground side. A 2 channel scope 50 readings show what the waveforms look like when lead 1, 20 and lead 2, 22 of the third motor 14 are scoped. It's a split sine wave with positive voltage on top and negative voltage on the bottom.

When the system runs, motor 10 supplies positive voltage/current to lead 1 of motor 14, at that same time the other half of the sine wave has no voltage/current so lead 2 of motor 14 becomes the ground lead. Then on the next half of the sine wave motor 12 supplies negative voltage/current to lead 2 of motor 14 and lead 1 becomes the ground.

Under current beliefs if you reverse current flow across the leads of motor 3 then the magnetic fields would reverse, but because the current is changing positive and negative magnetic polarity, and changing in direction then magnetic poles stays the same, so it acts like DC current. Because the current is changing direction at 60 hz the counter EMF or back EMF that goes against incoming current, that wants to lower voltage, now is met with a voltage that coincides with the back EMF and helps hold voltage up resulting in more usable voltage across the armature. That means that the supplied voltage is not being reduced from back EMF, making the magnetic flux density increase.

The result is a DC motor that runs faster, about 25% faster under load, produces more usable torque at rated voltage and uses less current and runs on alternating sine waves. In this scenario, motors 10 and 12 create the necessary waveforms and voltage polarities along with supplying the grounds. They also, which is still in research split a normal 120 volt sine wave so that the positive is now on a lead and the negative is on a separate lead. When paired back together on the different leads of a DC motor there is a 3 millisecond in phase shift at the beginning of each IA cycle of a normal 60 hz sine wave, the ascending voltage is extended by 3 milliseconds and the descending voltage is reduced by 3 milliseconds, the results are almost a doubling of line voltage at the motor. So the next step is to create an electronic circuit that will eliminate motors 10 and 12.

Test results illustrate a conventional ¼ hp motor outputting energy at much greater efficiency than it was rated to produce, and with significantly less power consumption than would be traditionally required by a motor of this design.

And proposed why the two DC motors play a large part in why the instant circuit works is that the diodes placed on the each leg are oriented to block out part of the AC sine wave, so as 1 blocks out the positive side of the sine wave and the other blocks out the negative side of the sine wave.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A high efficiency motor using alternating ground paths comprising:

a control circuit;

first and second DC motors coupled to said control circuit, said first DC motor supplying positive voltage/current to lead 1 of a third motor using AC voltage with a lead 2 of said third motor providing a ground lead, said second DC motor supplying negative voltage/current to said lead 1 of said third DC motor with said lead 2 providing a ground lead;

to provide individual power and ground paths for a third motor coupled to said circuit using AC voltage, each of said two DC motors providing power and ground for one leg of said third DC motor;

wherein each of said DC motors providing power and ground for one leg of said third motor whereby said third motor operates at a higher efficiency by converting energy into power reducing heat, motor maintenance while increasing longevity.

2. The high efficiency motor using alternating ground paths according to claim 1 wherein said control circuit splits sine wave alternating ground paths between said first and second motor.

3. The high efficiency motor using alternating ground paths according to claim 1 wherein a reverse current flow across said leads of said third motor causes magnetic fields to reverse.

4. The high efficiency motor using alternating ground paths according to claim 3 wherein said reverse current flow is changing positive and negative magnetic polarity and changing direction at 60 Hz wherein a counter EMF is against the incoming current.

5. The high efficiency motor using alternating ground paths according to claim 1 wherein control circuit splits sine wave increases usable voltage across an armature of said third motor.

6. The high efficiency motor using alternating ground paths according to claim 1 wherein control circuit creates a flux density increase in said third motor.

7. The high efficiency motor using alternating ground paths according to claim 1 wherein said leads include a 3 millisecond in phase shift at the beginning of each A cycle of a normal 60 hz sine wave whereby an ascending voltage is extended by 3 milliseconds and a descending voltage is reduced by 3 milliseconds.

\* \* \* \* \*